United States Patent [19]

Wu

[11] Patent Number: 5,988,543

[45] Date of Patent: Nov. 23, 1999

[54] PEPPER GRINDING TOOL

[75] Inventor: Hua-Te Wu, Tainan, Taiwan

[73] Assignee: Yienn Lih Enterprise Co., Ltd., Tainan, Taiwan

[21] Appl. No.: 09/212,298

[22] Filed: Dec. 16, 1998

[51] Int. Cl.[6] .................................................. A47J 42/34
[52] U.S. Cl. ........................................ 241/168; 241/169
[58] Field of Search .................................. 241/168, 169, 241/270, 262; 222/142.1, 142.2, 142.3, 142.4, 142.5, 142.6, 142.7

[56] References Cited

U.S. PATENT DOCUMENTS

| | | | |
|---|---|---|---|
| 4,697,749 | 10/1987 | Holcomb et al. | 241/169 |
| 5,199,655 | 4/1993 | Yang | 241/169 |
| 5,730,374 | 3/1998 | Wu | 241/169 |

*Primary Examiner*—John M. Husar
*Attorney, Agent, or Firm*—Rosenberg, Klein & Bilker

[57] ABSTRACT

A pepper grinding tool comprises a toothed plate capable of moving relative to a toothed portion of an adjustable grinder part, and an adjustment assembly for adjusting a position of the grinder part relative to the toothed plate such that the pepper grinding tool can grind pepper between the toothed plate and the toothed portion into ground particulater of various degrees of according to need. The adjustment assembly includes a threaded portion screwed into a threaded hole of the grinder part, and a finger portion for a user to turn the adjustment assembly therefrom for adjusting the position of the grinder part.

3 Claims, 6 Drawing Sheets

PEPPER GRINDING TOOL

BACKGROUND OF THE INVENTION

The present invention relates to a pepper grinding tool.

Referring to FIGS. 7 and 8, a heretofore known pepper grinding tool, which was filed by the same inventor of the present invention on Nov. 25, 1996, and patented from the U.S. Patent & Trademark Office on Mar. 24, 1998 with U.S. Pat. No. 5,730,374, comprises a head member 1, a bottom socket 2, a restraining plate 3, a guide member 4, an adjustable grinder part 5, a movable member 6, a depressed block 7, a handled member 8, and an adjustment block 9 as main parts.

The head member 1 has a hollow portion 12, which is a hollow on a mediate portion thereof.

The restraining plate 3 is fixedly disposed on a bottom of the head member 1, and has a hole for an upper end of the movable member 6 to be passed therethrough.

The bottom socket 2 is fixedly connected to the bottom of the head member 1, and has a condiment exit 22 for a lower end of the movable member 6 to be passed therethrough.

The guide member 4 is fastened between the restraining plate 3 and the bottom socket 2.

The adjustable grinder part 5 is movably disposed in a guide channel of the guide member 4, and has a sloped toothed portion 51 facing the mavable member 6. The adjustable block 9 is provided for a user to adjust the distance between the sloped toothed portion 51 of the grinder part 5 and a toothed plate 62 fixed to the movable member 6, the grinder part 5 being capable of moving toward, or away from, the toothed plate 62 upon moving the adjustable block 9.

A spring 61 is associated with the movable member 6 to give it an upward biasing force.

The depressed block 7 is disposed on the hollow portion 12 of the head member 1, coupled to a top end of the movable member 6.

The handled member 8 is disposed within the hollow portion 12 of the head member 1, and pivoted to the head member 1 from a lower end thereof such that the handled member 8 can be pressed to move inwardly of the head member 1. The handled member 8 further has a pushing protrusion 81, which is adjacent to a top end slope 72 of the depressed block 7, such that the depressed block 7 is pushed downwards upon pushing the handled member 8 inwardly of the head member 1. Thus, the movable member 6 moves downward in order for the toothed plate 62 coupled thereto to move relative to the sloped toothed portion 51 of the grinder part 5 to grind pepper disposed in between.

The spring 61 biases the movable member 6 upward on the user releasing the handled member 8 after pressing. So, the user can press and release the handled member 8 repeatedly for the toothed plate 62 to move upward and downward to grind the pepper.

When the pepper is ground into finer one, it falls out of the pepper grinding tool from the condiment exit 22.

SUMMARY

The present invention relates to a pepper grinding tool for grinding pepper into ground particulater, and particularly to one which has an adjustment assembly for a user to easily and precisely adapt the same for making pepper particulater of various degress of fineness.

The pepper grinding tool of the present invention comprises:

(a) a head member having a hollow, (b) handled member disposed in said head member and pivoted to said head member from a lower end of said head member, (c) a restraining plate fixed to a bottom of said head member, (d) a bottom socket fixedly connected to said head member bottom to form a bottom chamber between said restraining plate and said bottom socket, (e) a guide member captured in said bottom chamber, (f) a grinder part mavably disposed in a guide channel of said guide member, said grinder part having a toothed portion, (g) a movable member passed through a hole of said restraining plate, and a pepper exit opening of said bottom socket, said movable member being operationally associated with said handled member, (h) a spring fitted to said movable member to provide same an upward biasing force, (i) a toothed plate coupled to said movable member on a side opposing said toothed portion of said grinder part, (j) an adjustment assembly including
   (1) a connecting member movably held in a cylindrical hollow of said bottom socket, said connecting member having a threaded end portion screwed into a threaded hole of said grinder part,
   (2) a turning member connected to said connecting member, and having a finger portion for a user to rotate same therefrom, said movable member being capable of moving down on a user's pressing said handled member, and moving up on the user's releasing said handled member by the upward biasing force of the spring such that the user can press and release the handled member repeatedly to move the toothed plate up and down reciprocatingly to grind pepper between the toothed plate and the toothed portion;

said connecting member being capable of turning for adjusting a position of said grinder part relative to said toothed plate on a user's turning said turning member.

BRIEF DESCRIPTION OF THE DRAWINGS

The present invention will be better understood by reference to the accompanying drawings, wherein.

DETAILED DESCRIPTION OF THE PREFERRED EMBODIMENT

Figure 1:
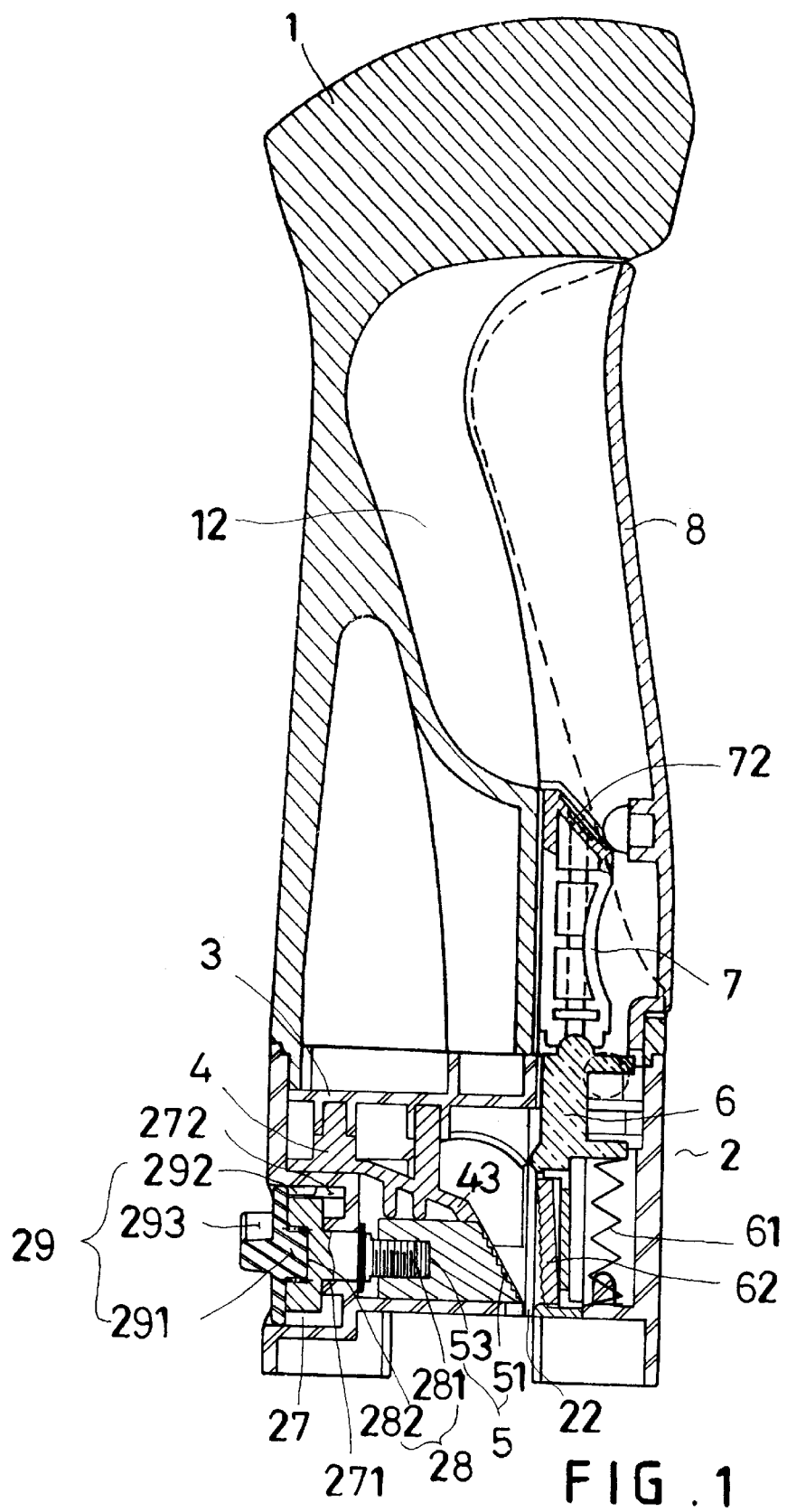
FIG. 1 is a sectional view of a pepper grinding tool according to the present invention.
Figure 2:
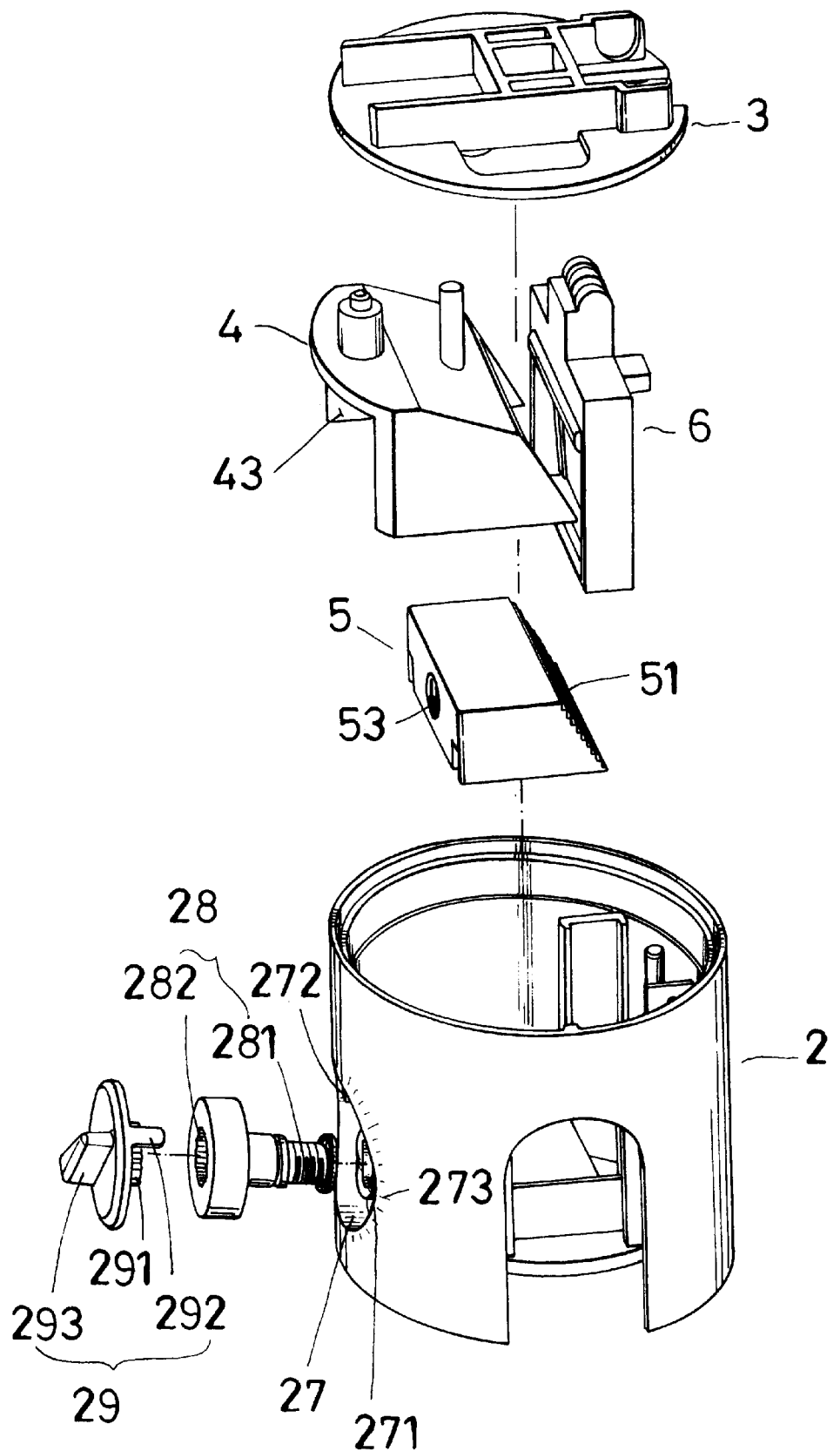
FIG. 2 is an exploded perspective view of a bottom socket, and an adjustment assembly according to the present invention.
Figure 4:
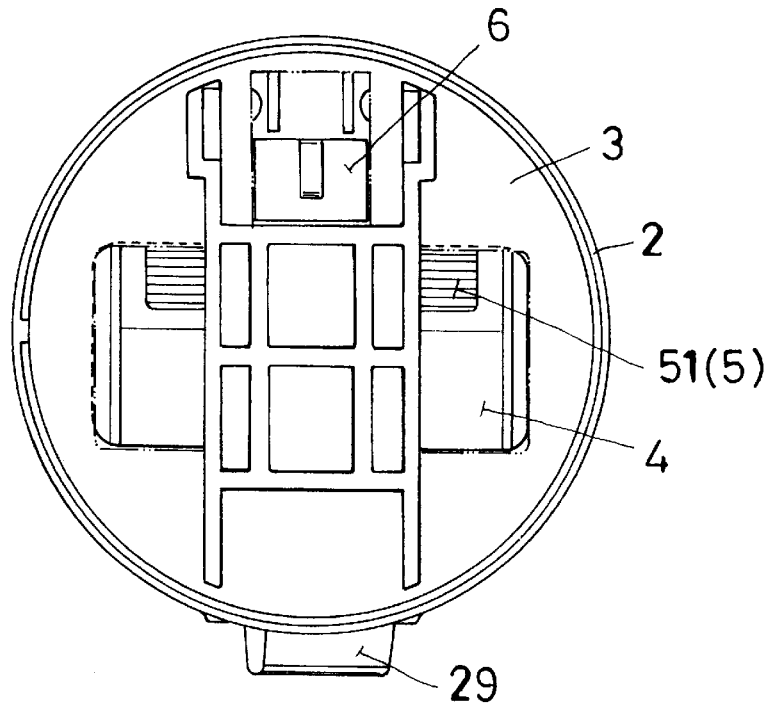
FIG. 4 is a verticle view of the bottom socket, and the adjustment assembly according to the present invention.
Figure 3:
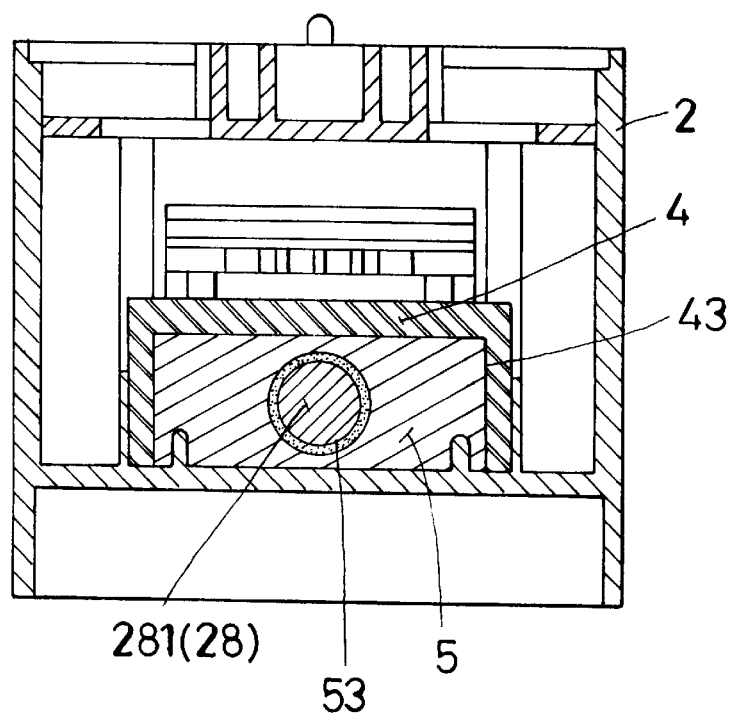
FIG. 3 is a sectional view of the bottom socket, and the adjustment assembly according to the present invention.
Figure 6:
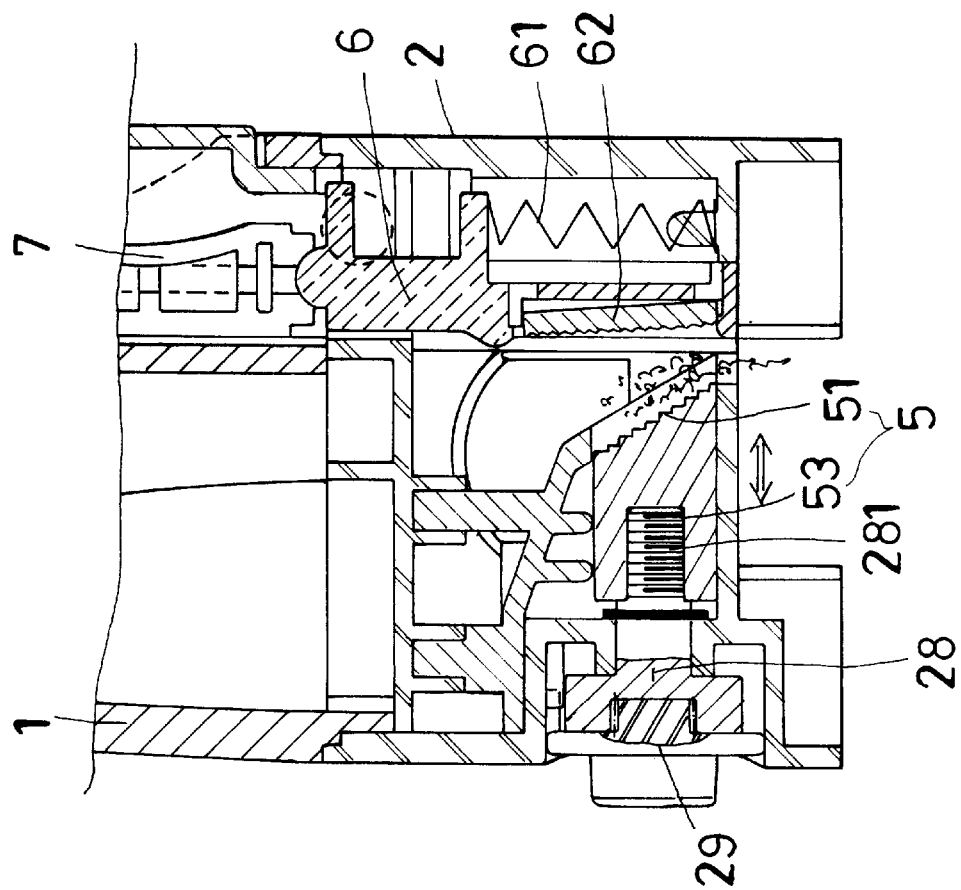
FIG. 6 is a view showing the adjustment assembly and the associated parts under adjustment action.
Figure 5:
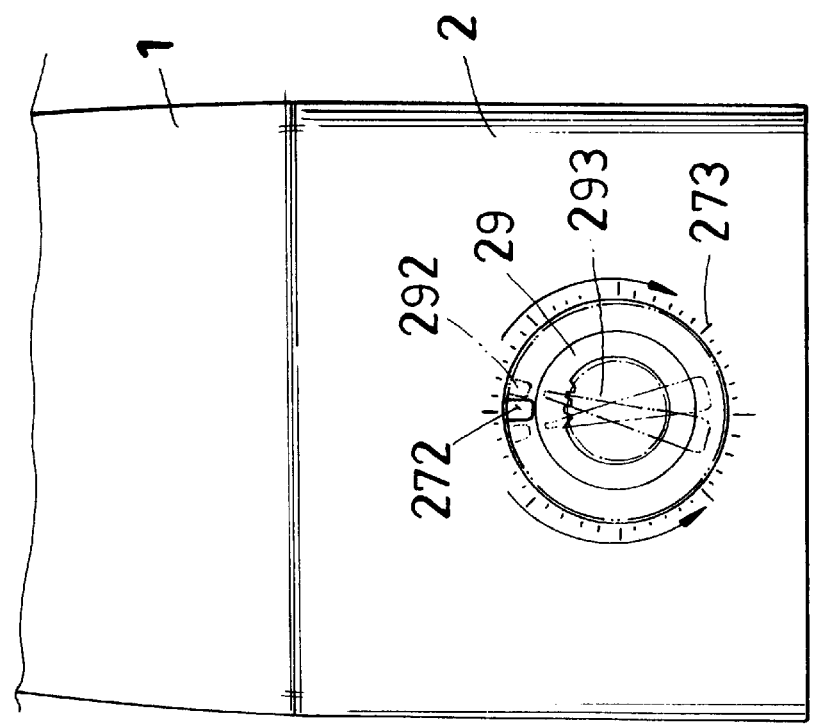
FIG. 5 is a front view of the adjustment assembly according to the present invention.
Figure 7:
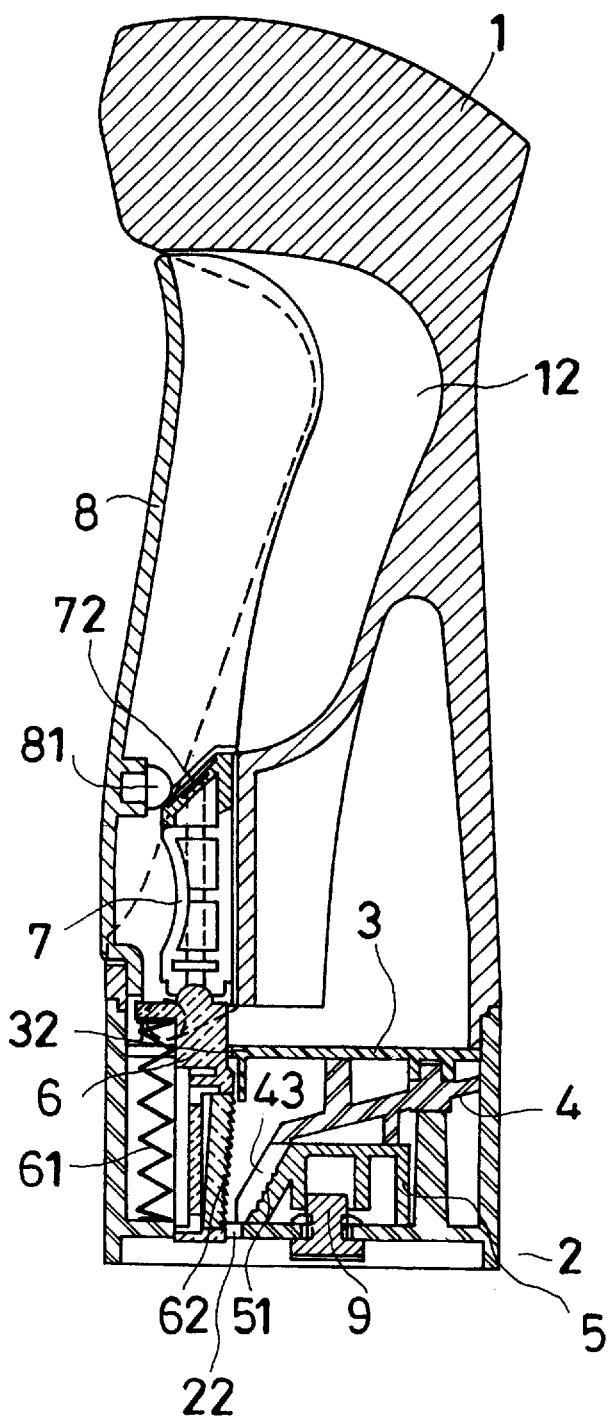
FIG. 7 is a sectional view of a prior art pepper grinding tool as described in the Background with the handled member being pushed.
Figure 8:
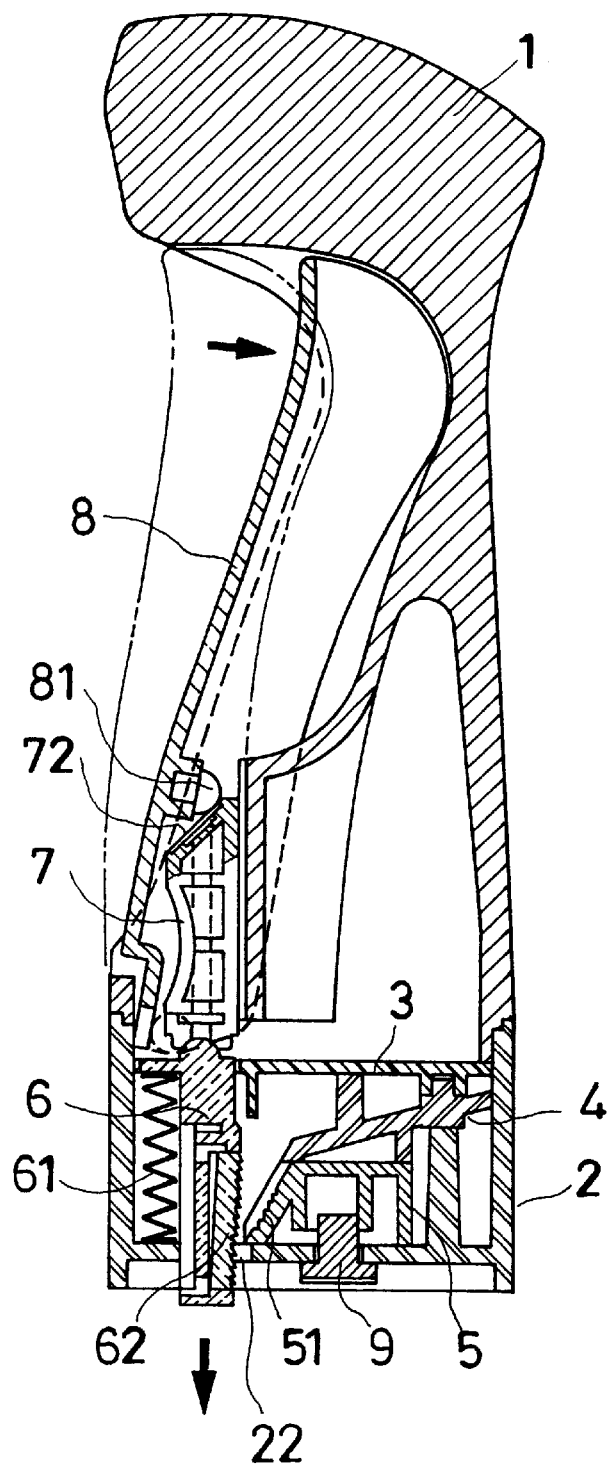
FIG. 8 is a sectional view of a prior art pepper grinding tool as described in the Background with the handled member being released.

A pepper grinding tool of the present invention, referring to FIGS. 1 and 2, comprises a head member 1, a bottom socket 2, a restraining plate 3, a guide member 4, an adjustable grinder part 5, a movable member 6, a depressed block 7 and a handled member 8 as main parts.

The head member 1, the restraining plate 3, the guide member 4, the movable member 6, the depressed block 7 and the handled member 8 are the same as the corresponding parts of the prior art pepper grinding tool as described in the Background; the head member 1 has a hollow portion 12, which is a hollow in mediate portion thereof; the restraining plate 3 is connected to a bottom of the head member 1, and has a hole for an upper end portion of the movable member 6 to be passed therethrough; the bottom socket 2 is fixed to the bottom of the head member 1, and has a condiment exit 22 for a lower end portion of the movable member 6 to be passed therethrough; the guide member 4 is fixedly disposed within the bottom socket 2, and has guide channel 43; the grinder part 5 is movably disposed in the guide channel 43 of the guide member 4, and has a sloped toothed portion 51 on a first side, and a threaded hole 53 on a second side opposite the first side; the depressed block 7 is disposed on the hollow portion 12 of the head member 1, coupled to a top end of the movable member 6, and has a slope 72 on a top end thereof; the handled member 8 is disposed within the hollow portion 11, and pivoted to the head member 1 from a lower end thereof such that the handled member can be pressed to move inwardly of the head member 1; the handled member 8 has a curved pushing protrusion, which is adjacent to the slope 72 of the depressed block 7, such that the depressed block is pressed downward on the user's pushing the handled member 8 inwardly of the head member 1. A toothed plate 62 is coupled to the movable member 6 with toothed surface thereof opposing the sloped toothed portion 51 of the grinder part 5. The movable member 6 is further associated with a spring 61 such that the movable member 6 is biased upwardly by the spring 61.

When handled member 8 is pressed inwardly of the head member, the movable member 6 together with the depressed block 7 is moved downward such that the toothed plate 62 moves relative to the sloped toothed portion 51 to grind pepper in between into finer one.

The spring 61 biases the movable member 6 upward on the user's releasing the handled member after pressing. So the user can press and release the hanle member 8 repeatedly for the toothed plate 62 to move up and down reciprocatingly to grind the pepper. And the ground finer pepper is let out of the grinding tool from the condiment exit 22.

The bottom socket 2 of the pepper grinding tool according to the present invention further has a cylindrical hollow 27, a holding part 271 in a center of the cylindrical hollow 27, a stopping protrusion 272, and a set of graduations 273 disposed around the cylindrical hollow 27.

A connecting member 28 is rotatably housed within the cylindrical hollow 27 of the bottom socket 2; the connecting member 28 has a threaded portion 281 passed through the holding part 271 of the bottom socket 2, and has a plurality of cog teeth 282 on inner circumference of an end opposing the threaded portion 281. The threaded portion 281 is further screwed into the threaded hole 53 of the grinder part 5.

A turning member 29 is rotatably mounted on the cylindrical hollow 27, and has a plurality of cog teeth 291 engaging the cog teeth 282 of the connecting member 28 such that the connecting member 28 can be rotated along with the turning member 29. The turning member 29 further has a finger portion for the user to rotate the turning member 29 with his fingers, and has a stopping projection 292 capable of engaging the stopping protrusion 272 of the bottom socket 2 to confine the turning movement thereof.

When the turning member 29 is turned by the user, the connecting member 28 will also turn such that the grinder part is moved along the guide channel 43 of the guide member 4.

Thus, the distance between the sloped toothed portion 51 of the grinder member 5 and the toothed plate 62 is adjusted for various degrees of fineness of pepper. Furthermore, the user can adjust the grinder part 5 to his desired position by observing the position of the finger portion 293 of the turning member 29 relative to the graduations 273, i.e. the fineness of pepper can be properly adjusted by the graduations 273 and the finger portion 293.

From the above description, it can be understood that the pepper grinding tool of the present invention has following advantages.

1. It is very easy to adjust the pepper grinding tool for various degrees of fineness of pepper, turning the turning member to change the position of the grinder part.

2. The graduations and the finger portion of the turning member help the user easily locates the grinder part such that the fineness of pepper is precisely set.

What is claimed is:

1. A condiment grinding tool for grinding a condiment into ground particulates comprising:
   (a) a head member having a hollow portion and a lower end portion,
   (b) a grinding support assembly coupled to said lower end portion of said head member, said grinding support assembly including:
       (1) a bottom socket defining a bottom chamber for storing said condiment, said bottom socket having formed therein an exit opening disposed in open communication with said bottom chamber, and having a side cylindrical hollow,
       (2) a restraining plate coupled to said bottom socket, said restraining plate having a through hole formed therein,
       (3) a guide member captured between said bottom socket and said restraining plate, said guide member having formed therein a channeled guide portion,
       (4) a grinder part disposed within said bottom socket, said grinder part adjustably engaging said channeled guide portion of said guide member, said grinder part having a toothed portion formed thereon; and a threaded hole disposed in opposition to said toothed portion,
   (c) a grinding assembly coupled to said grinding support assembly, said grinding assembly extending through said restraining plate through hole to said exit opening of said bottom socket, said grinding assembly including:
       (1) a linearly displaceable movable member, said movable member being coupled to said bottom socket in resiliently biased manner; and,
       (2) a toothed plate coupled to said movable member, said toothed plate being disposed in said bottom chamber substantially opposing said toothed portion of said grinder part;
   (d) a handled member displaceably coupled to said head member, said handled member having a pushing block portion formed thereon; and, (e) a displaceable depressed block coupled to said grinding assembly for transfering a displacement of said handled member to a linear displacement of said movable member, said depressed block having a sloped surface adapted for engagement by said pushing block portion of said handled member;

(f) an adjustment assembly rotatably coupled to said side cylindrical hollow, said adjustment assembly including:

(1) a connecting member having a threaded end portion at a first end and a second end having a plurality of cog teeth in an inner circumference thereof, said threaded end portion being screwed into said threaded hole of said grinder part for transferring a turning displacement of said adjustment assembly to a linear displacement of said grinder part, (2) a turning member having a finger portion disposed outwardly of said bottom socket, said turning member having a plurality of cog teeth on an end opposing said finger for engagement with said cog teeth of said connecting member, whereby said condiment stored in said bottom chamber is ground between said toothed plate and said toothed portion of said grinder part into said ground particulates for dispensing thereof through said bottom socket exit opening, and said grinder part is linearly displaced relative to said toothed plate on turning movement of said adjustment assembly for said condiment to be ground into ground particulater of various degrees of fineness.

2. The condiment grinding tool as claimed in claim 1 wherein said turning member has a stopping projection, and said cylindrical hollow has a stopping protrusion for separable engagement with said stopping projection of said turning member.

3. The condiment grinding tool as claimed in claim 1 wherein said bottom socket has graduations formed around said cylindrical hollow for showing a position of said adjustment assembly relative thereto.

\* \* \* \* \*